US 9,170,988 B2

(12) United States Patent
Kanemitsu

(10) Patent No.: US 9,170,988 B2
(45) Date of Patent: Oct. 27, 2015

(54) METHOD FOR CAUSING COMPUTER TO DISPLAY PAGE VIEW ON DISPLAY AREA BY CONVERTING HTML PAGE INTO NEW HTML PAGES, AND NON-TRANSITORY COMPUTER READABLE MEDIA RECORDING PROGRAM

(75) Inventor: Shigenaka Kanemitsu, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 1902 days.

(21) Appl. No.: 11/985,276

(22) Filed: Nov. 14, 2007

(65) Prior Publication Data

US 2008/0215963 A1   Sep. 4, 2008

(30) Foreign Application Priority Data

Nov. 15, 2006  (JP) ................................ 2006-308980

(51) Int. Cl.
G06F 17/00       (2006.01)
G06F 17/21       (2006.01)
G06F 17/30       (2006.01)
G06F 17/22       (2006.01)
(Continued)

(52) U.S. Cl.
CPC ............. *G06F 17/217* (2013.01); *G06F 3/125* (2013.01); *G06F 3/1246* (2013.01); *G06F 17/211* (2013.01); *G06F 17/212* (2013.01); *G06F 17/227* (2013.01); *G06F 17/2247* (2013.01); *G06F 17/24* (2013.01); *G06F 17/241* (2013.01); *G06F 17/3089* (2013.01); *G06F 17/3092* (2013.01)

(58) Field of Classification Search
CPC ............ G06F 17/2247; G06F 17/3089; G06F 17/211; G06F 17/217; G06F 17/227; G06F 17/241; G06F 17/212; G06F 17/24; G06F 17/3092; G06F 3/1246; G06F 3/125
USPC ........... 715/238, 209, 210, 255, 205; 434/317
See application file for complete search history.

(56) References Cited

U.S. PATENT DOCUMENTS 6,334,056 B1 * 12/2001 Holmes et al. ................. 455/445
6,396,500 B1 *  5/2002 Qureshi et al. ................ 345/473

(Continued)

FOREIGN PATENT DOCUMENTS

JP    H10-187112    7/1998
JP    2002-108762   4/2002

(Continued)

OTHER PUBLICATIONS

Watters, Carolyn et al., PDA Access to Internet Content: Focus on Forms, 2002, IEEE, Proceedings of the 36th Hawaii International Conference on System Sciences (HICSS'03), pp. 1-9.*

(Continued)

*Primary Examiner* — Nathan Hillery
(74) *Attorney, Agent, or Firm* — Dilworth & Barrese, LLP

(57) ABSTRACT

A simple and easy-to-use method is provided for dividing an html page at positions intended by the designer in accordance with the type of display device on which the page is to be displayed. A controller searches an html page for comment statements that have been formed according to predetermined grammatical rules and inserted in advance into the html page coding, divides the html page at positions at which the comment statements are found to have been inserted, restores to each divided html page the attribute data lost due to the division process, and generates the new html pages.

3 Claims, 14 Drawing Sheets

(51) Int. Cl.
*G06F 17/24* (2006.01)
*G06F 3/12* (2006.01)

(56) References Cited

U.S. PATENT DOCUMENTS

| | | | |
|---|---|---|---|
| 6,430,624 B1* | 8/2002 | Jamtgaard et al. | 709/246 |
| 6,456,305 B1* | 9/2002 | Qureshi et al. | 715/800 |
| 6,523,062 B1* | 2/2003 | Bridgman et al. | 709/203 |
| 6,631,373 B1* | 10/2003 | Otani et al. | 1/1 |
| 6,763,248 B1* | 7/2004 | Odamura | 455/557 |
| 6,857,102 B1* | 2/2005 | Bickmore et al. | 715/205 |
| 6,964,014 B1* | 11/2005 | Parish | 715/205 |
| 7,392,471 B1* | 6/2008 | Ford et al. | 715/234 |
| 2001/0011364 A1* | 8/2001 | Stoub | 717/1 |
| 2001/0032254 A1* | 10/2001 | Hawkins | 709/219 |
| 2002/0040374 A1* | 4/2002 | Kent | 707/516 |
| 2002/0059343 A1* | 5/2002 | Kurishima et al. | 707/512 |
| 2002/0078092 A1* | 6/2002 | Kim | 707/513 |
| 2002/0099785 A1* | 7/2002 | Teeple | 709/214 |
| 2002/0109706 A1* | 8/2002 | Lincke et al. | 345/700 |
| 2003/0041056 A1* | 2/2003 | Bossemeyer et al. | 707/3 |
| 2003/0079183 A1 | 4/2003 | Tada et al. | |
| 2003/0115365 A1* | 6/2003 | Lindsey | 709/246 |
| 2003/0185182 A1* | 10/2003 | Young et al. | 370/338 |
| 2004/0019688 A1* | 1/2004 | Nickerson et al. | 709/229 |
| 2004/0025116 A1* | 2/2004 | Yashiro | 715/513 |
| 2004/0059778 A1* | 3/2004 | Yoshida et al. | 709/203 |
| 2004/0095396 A1* | 5/2004 | Stavely et al. | 345/838 |
| 2005/0022115 A1* | 1/2005 | Baumgartner et al. | 715/513 |
| 2005/0165835 A1 | 7/2005 | Sawada | |
| 2005/0200907 A1* | 9/2005 | Kitayama et al. | 358/444 |
| 2005/0229111 A1* | 10/2005 | Makela | 715/802 |
| 2006/0046686 A1* | 3/2006 | Hawkins et al. | 455/403 |
| 2007/0245233 A1* | 10/2007 | Kim | 715/513 |
| 2008/0147487 A1* | 6/2008 | Hirshberg | 705/10 |

FOREIGN PATENT DOCUMENTS

| | | |
|---|---|---|
| JP | 2002-351736 | 12/2002 |
| JP | 2003/271508 | 9/2003 |
| JP | 2006-155147 | 6/2006 |
| JP | 2006/238010 | 9/2006 |
| WO | 02/103554 | 12/2002 |

OTHER PUBLICATIONS

Notice of Reasons for Rejection issued to JP Application No. 2006-308980, mailed Aug. 31, 2010.

* cited by examiner

FIG. 3

```
<form name="form1" method="post" action="">
<table width="95%" border="0" cellspacing="1" cellpadding="1">
<tr>
<td valign="top">Label</td>
<td colspan="3"><textarea name="textarea" cols="40" rows="20"></textarea></td>
</tr>
<tr>
<td valign="top"> </td>
<td colspan="3"> </td>
</tr>
<!--SmallBreak -->
<tr>
<td width="20%" valign="top">TextBox</td>
<td colspan="3"><input name="textfield" type="text" size="40" maxlength="40"></td>
</tr>
...
```

FIG. 4
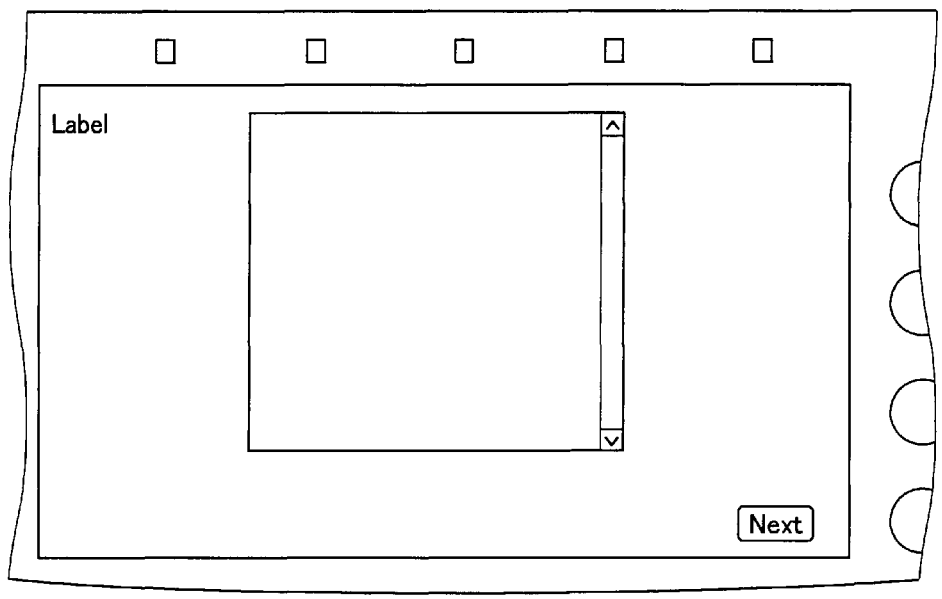
(UPPER PORTION)
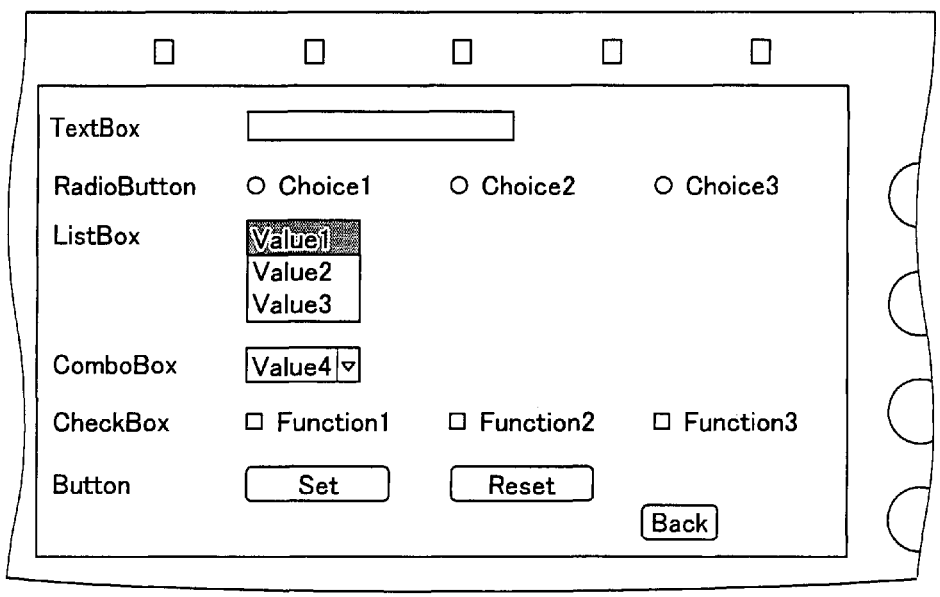
(LOWER PORTION)

FIG. 9

DIVIDED PAGE TABLE

| INPUT PAGE | ORDER | NEW PAGES | INPUT DATA |
|---|---|---|---|
| AAA.html | 1 | AAA.001.html | A=XXX, B=123 |
| | 2 | AAA.002.html | C=TRUE |
| | ⋮ | ⋮ | ⋮ |
| ⋮ | ⋮ | ⋮ | ⋮ |

FIG. 13

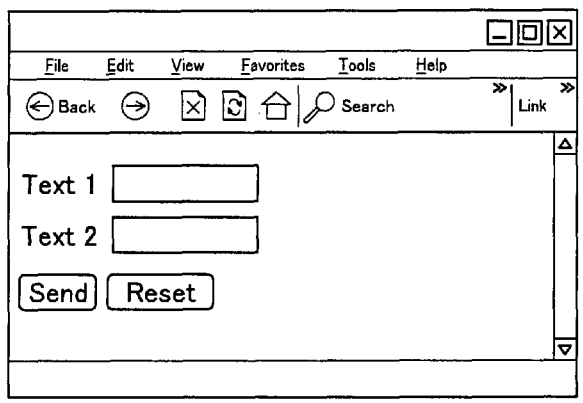

FIG. 14

```
<body>                                                        Fa
  <form name="form1" method="post" action="http://.../next.htm">  }21
    <table width="75%" border="0" cellspacing="1" cellpadding="1"> }22
      <tr>                                                    ⎫
        <td>Text 1                                            ⎬ Ta
          <input type="text" name="textfield"></td>           }23
      </tr>
      <!--SmallBreak -->  ~24
      <tr>
        <td>Text 2
          <input type="text" name="textfield2"></td>          }25
      </tr>
      <tr>
        <td><input type="submit" name="Submit" value="Send">
          <input type="reset" name="Submit2" value="Reset"></td> }26
      </tr>
    </table>
  </form>
</body>
```

FIG. 15

```
<body>                                                    Fa'
 <form name="form1.001" method="post" action="(URL of the next page)">   }21a
  <table width="75%" border="0" cellspacing="1" cellpadding="1">         }22
   <tr>                                                  ⎫ Ta
    <td>Text 1                                           ⎬
     <input type="text" name="textfield"></td>           ⎭ 23
   </tr>
   <tr>                                                  ⎫
    <td><input type="submit" name="Submit" value="Send"> ⎬ 26
     <input type="reset" name="Submit2" value="Reset"></td> ⎭
   </tr>
  </table>
 </form>
</body>
```

```
<body>                                                    Fa"
 <form name="form1.002" method="post" action="http://.../next.htm">   }21b
  <table width="75%" border="0" cellspacing="1" cellpadding="1">        }22
   <tr>                                                  ⎫ Ta
    <td>Text 2                                           ⎬
     <input type="text" name="textfield2"></td>          ⎭ 25
   </tr>
   <tr>                                                  ⎫
    <td><input type="submit" name="Submit" value="Send"> ⎬ 26
     <input type="reset" name="Submit2" value="Reset"></td> ⎭
   </tr>
  </table>
 </form>
</body>
```

METHOD FOR CAUSING COMPUTER TO DISPLAY PAGE VIEW ON DISPLAY AREA BY CONVERTING HTML PAGE INTO NEW HTML PAGES, AND NON-TRANSITORY COMPUTER READABLE MEDIA RECORDING PROGRAM

This application is based on and claims the benefit of priority from Japanese Patent Application No. 2006-308980, filed on 15 Nov. 2006, the content of which is incorporated herein by reference.

BACKGROUND OF THE INVENTION

1. Field of the Invention

The present invention relates to a method, apparatus, and computer readable media for converting an html page into new html pages.

2. Related Art

HTML (Hyper Text Markup Language) is the predominant method for arranging text and other content in a page view to be displayed on the WWW (World Wide Web). In general, html pages (e.g., webpages) are most often displayed on the monitor of a personal computer; however, recent portable devices such as mobile telephones, data terminals such as PDAs (Personal Digital Assistants), office devices such as MFPs (Multi-Function Peripherals) and various other types of devices have been enabled to display html pages.

In addition, many systems utilizing html pages for displaying Web applications or the like in a browser have been developed, among which there are numerous examples in which the display device is not restricted to being of a certain type.

These circumstances present a situation in which various sizes of display screens are being used, and it can be difficult for a user using another type of electronic device with a small display screen to view or navigate a page designed to be displayed on the monitor of a personal computer.

For example, if a page is displayed on the small display screen of an electronic device, due to the fact that the entire page cannot fit within the display area of the small screen, a fine scroll bar is required for navigation. Furthermore, the fine scroll bar is not suitable for use as a touch panel to be operated by finger. In order to facilitate display on a variety of display devices, one option to be considered is that of designing a page for each type of display device; however, that would significantly increase the workload on the designer.

In response to the above-described conditions, a method for automatically dividing pages according to the size of the display device on which they are to be displayed has been proposed. For example, an apparatus for dividing pages according to the size of the display device, and switching between displaying each of the divided pages that together constitute the original page has been disclosed. Furthermore, a system for determining the points at which to divide the page based on the distance between elements of the content (the integral of the depth of the tag nest) has been disclosed.

However, due to the fact that prior art such as that described above has the objective of automating the page division process, it is difficult to reflect the intention of the designer who created the pages regarding the positions where a page is to be divided. Accordingly, when the designer has desired to control the position at which a page is to be divided, it has been necessary to first understand the arrangement of the prior art, and then to repeatedly perform the division in a process of trial and error until a satisfactory result is attained.

Furthermore, when complex calculations are required to derive the page division position, unless there is high-performance processing capacity, it may not be possible to obtain user satisfaction with respect to display responsiveness.

SUMMARY OF THE INVENTION

The present invention has an objective of providing a simple and easy to use method for dividing an html page at positions at which the designer intends the html pages to be divided according to the type (size) of the display device.

More specifically, to realize the above-stated objective, a means such as the following is provided.

The apparatus according to the present invention is an apparatus for converting an html page to new html pages. The apparatus searches an html page for comment statements that have been composed according to predetermined grammatical rules and inserted in the html page in advance, divides the html page at the position at which the comment statement has been inserted, restores to each thus divided html page the attribute data lost due to the division process, and generates the new html pages.

In this way, the apparatus according to the pre sent invention is capable of dividing an html page into a plurality of new html pages in order to create page views of the pre-divided html page corresponding to the size of the display area on the target display device by discriminating the page division positions from the comment statements composed according to predetermined grammatical rules and inserted by the designer (creator of the html page). It thereby becomes possible to divide pages according to the intention of the designer, and furthermore, as this is accomplished by way of the simple and easily performed means of inserting comment statements, a method that reduces the burden on the designer can be provided.

Furthermore, because the inserted data are comment statements, browsers or other html processors not supporting the page division processing according to the presenting invention are able to read in and display the html pages containing the inserted comment statements without any problem. Therefore, the designer is able to easily specify page division positions without adversely affecting display devices for which it is not necessary that the pages be divided in order to be displayed.

BRIEF DESCRIPTION OF THE DRAWINGS

FIG. 3 shows html page coding according to a preferred embodiment of the present invention;

FIG. 4 illustrates an example of new html pages generated from the html page coding shown in FIG. 1 according to a preferred embodiment of the present invention;

FIG. 9 shows a Divided Page Table according to a preferred embodiment of the present invention;

FIG. 13 shows an example of an html page prior to the subjection thereof to the division processing according to a preferred embodiment of the present invention;

FIG. 14 shows an example of the html page coding of a pre-divided html page into which a division processing comment statement has been inserted according to a preferred embodiment of the present invention;

FIG. 15 shows an example of the html page coding of two new html pages created by dividing a single html page according to a preferred embodiment of the present invention;

DETAILED DESCRIPTION OF THE INVENTION

Hereinafter preferred embodiments of the present invention are described with reference to the attached drawings.

Display Examples

FIGS. 1 to 4 show an example of an html page displayed on different display devices in both the pre-division and post-division states according to a preferred embodiment of the present invention, and are used in explaining the outline of the present invention.

Figure 1:
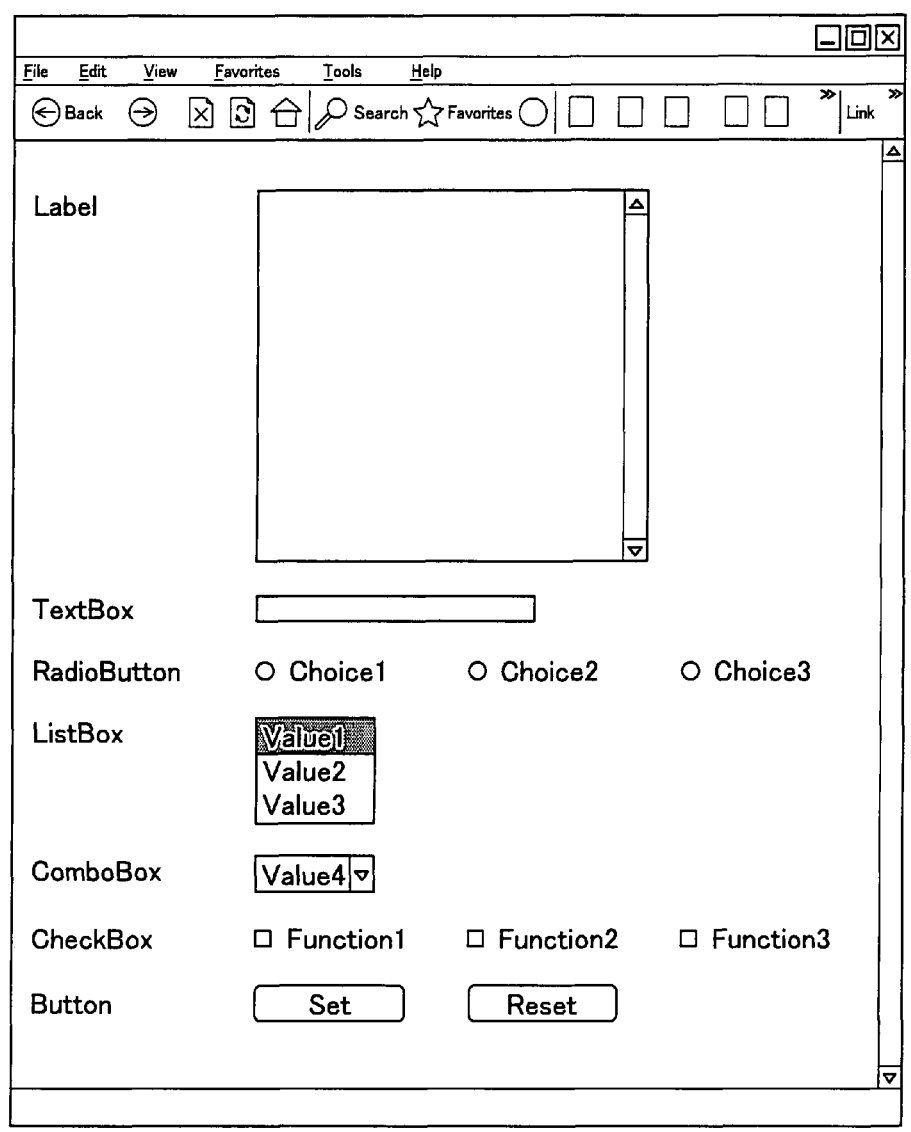
FIG. 1 illustrates an example of an html page displayed on the monitor of a personal computer according to a preferred embodiment of the present invention.
Figure 2:
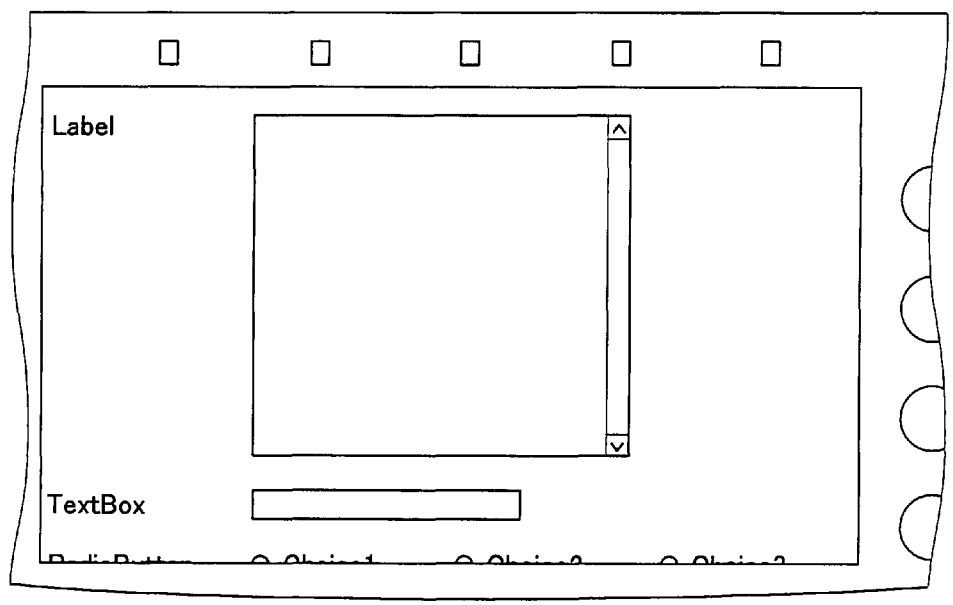
FIG. 2 illustrates an example of an html page displayed on the operating panel of an electronic device according to a preferred embodiment of the present invention.

FIGS. 1 and 2 show the views of the same html page displayed on the monitor of a personal computer and on the operation panel of an electronic device, respectively. In the case of display on the monitor of the personal computer, there is ample space in the display area to display all of the page elements on one screen; however, on the operation panel of the electronic device, due to insufficient space in the display area thereof, it is only possible to display a portion of the page elements.

Therefore, according to the current embodiment of the invention, as shown in FIG. 3, a predetermined keyword (<!--Small Break-->) is inserted into the html page coding, and the page is divided at the position of the insertion thereof. The keyword is normally processed as a comment statement; however, according to the apparatus of the current embodiment, a predetermined character string is discriminated (e.g., "Small Break"), and the page division process described below carried out.

It should be noted that the comment statement (keyword) is user defined, and can be used by the designer to set the page division position according to the size of the display area. In this manner, it thereby becomes possible to provide a page division method that is more efficient and more effective in comparison to automatic page division methods.

FIG. 4 shows the new html pages generated from the html page coding shown in FIG. 3 containing the inserted comment statement. Here, the single html page shown in FIG. 1 or FIG. 2 has been divided into two new html pages.

The first of the new html pages contains an active "Next" button that was not present in the pre-divided page, and when it is detected that the user has clicked on the "Next" button, the display transitions to the next page. On the second new page, which is the destination page of the transition initiated by clicking on the "Next" button from the first new page, there is an active "Back" button; in the same manner as for the "Next" button, upon detection that the user has clicked on the "Back" button, the display transitions to the first new page. In this manner, by switching the display between a plurality of new html pages, the user is able to browse the content of the plurality of divided pages that together constitute that of the single pre-divided page, which would have required scrolling to view the entirety of the content thereof due to the fact that its size exceeded that of the available display area.

System Configuration

Figure 5:
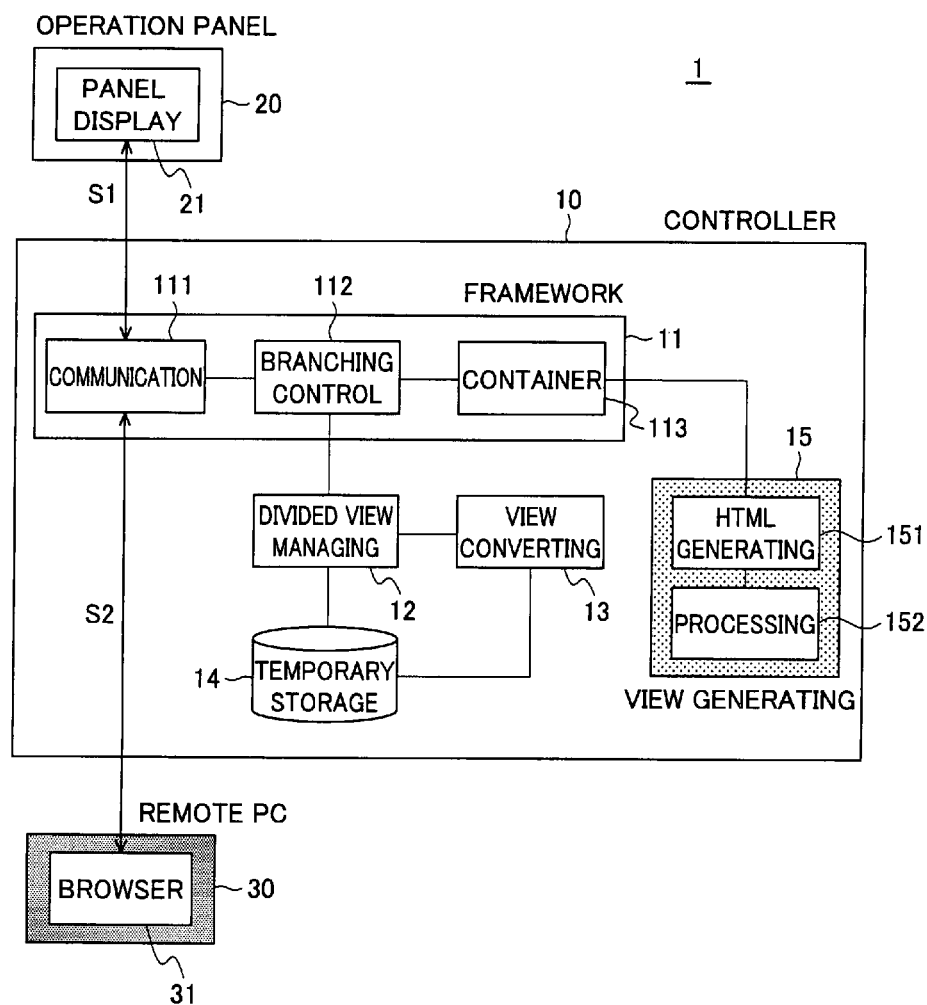
FIG. 5 is a schematic block diagram of the configuration of a system according to a preferred embodiment of the present invention.

FIG. 5 is a schematic block diagram of the configuration of a system 1 according to a preferred embodiment of the present invention.

A controller 10 receives a request from a panel display portion 21 of an operation panel 20 or a browser 31 of a remote PC (Personal Computer) 30 to display a page, and transmits the corresponding html page coding in order to display the page.

The controller 10 includes a framework portion 11, a divided view managing portion 12, a view converting portion 13, a temporary storage portion 14, and a view generating portion 15. The framework portion 11 includes a communication mechanism 111, a branching control mechanism 112, and a container mechanism 113. The container mechanism 113 issues requests to the view generating portion 15 to obtain application display data, which is in the form of html page coding. Here, the view generating portion 15 may be a software application provided with an html generating portion 151 and a processing portion 152, and may be configured as an information processing apparatus (e.g., a server) separate from the controller 10.

The communication mechanism 111 receives requests from the operation panel 20, the remote PC 30 or the like, and sends responses thereto. Here, the operation panel 20 and controller 10 may be contained in the same housing, or may be connected across a network, as in the case of the remote PC 30.

A URL (Uniform Resource Locator) identifying the application view is passed from the panel display portion 21 (or the browser 31) to the communication mechanism 111. The communication mechanism 111 converts the URL to an internal expression format, as required, and passes the data to the branching control mechanism 112. Here, along with the URL, the communication mechanism 111 may pass various types of parameter data, such as data identifying the type (size) of the panel display portion 21. The branching control mechanism 112 then passes the URL and parameters to the container mechanism 113.

The container mechanism 113 determines which application is to be called based on the URL and parameters, and passes the parameters to the view generating portion 15. In this way, the html page coding generated by the application is received by the container mechanism 113, and passed to the branching control mechanism 112.

The branching control mechanism 112 passes the html page coding to the divided view managing portion 12, and the divided view managing portion 12 carries out the html page coding division process described below, utilizing the view converting portion 13 and the temporary storage portion 14. Then, under the control of the branching control mechanism 112, the divided html page coding is suitably read out and sent via the communication mechanism 111 to the panel display portion 21 (or the browser 31), and displayed.

Here, the controller 10 is an information processing apparatus (CPU) for manipulating and processing information, and controls the entire apparatus according to the current embodiment. The controller 10 operates the above-described hardware by suitably reading out and executing each type of program stored in the memory portion, realizing each type of functionality according to the present invention.

The memory portion includes local memory for use in combination with the controller 10 for executing programs, large volume bulk memory, and cache memory for use performing search operations of said bulk memory efficiently. Types of memory that can be used to implement the computer readable media include electrical, electromagnetic, magnetic, optical, or electromagnetic memory. More specifically, the types include semiconductor memory apparatuses, electromagnetic tapes, magnetic disks, random access memory (RAM), read-only memory (ROM), optical disks, and the like.

Division Process Flow

Figure 6:
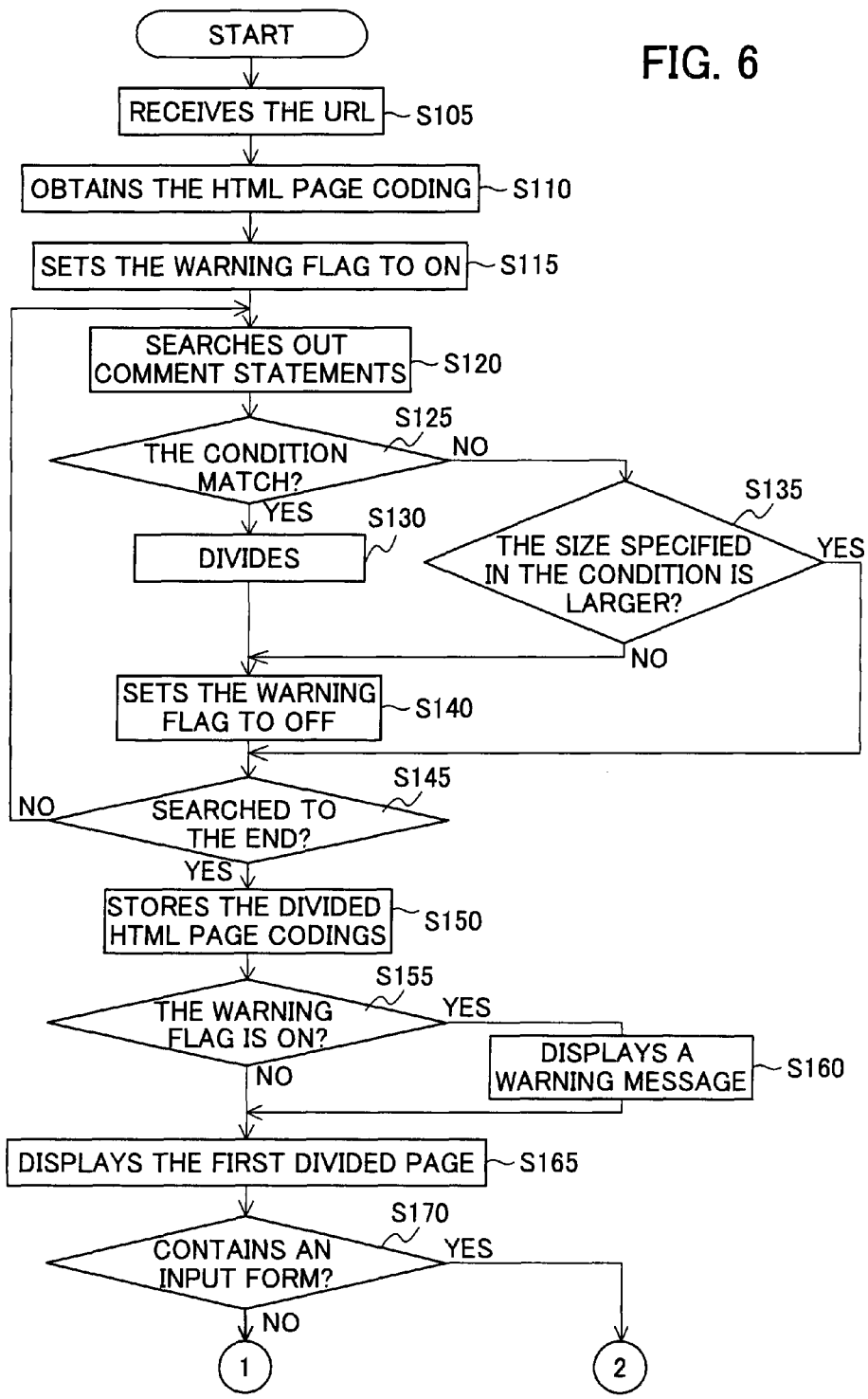
FIG. 6 is a flow chart showing the flow of processing according to a preferred embodiment of the present invention.
Figure 7:
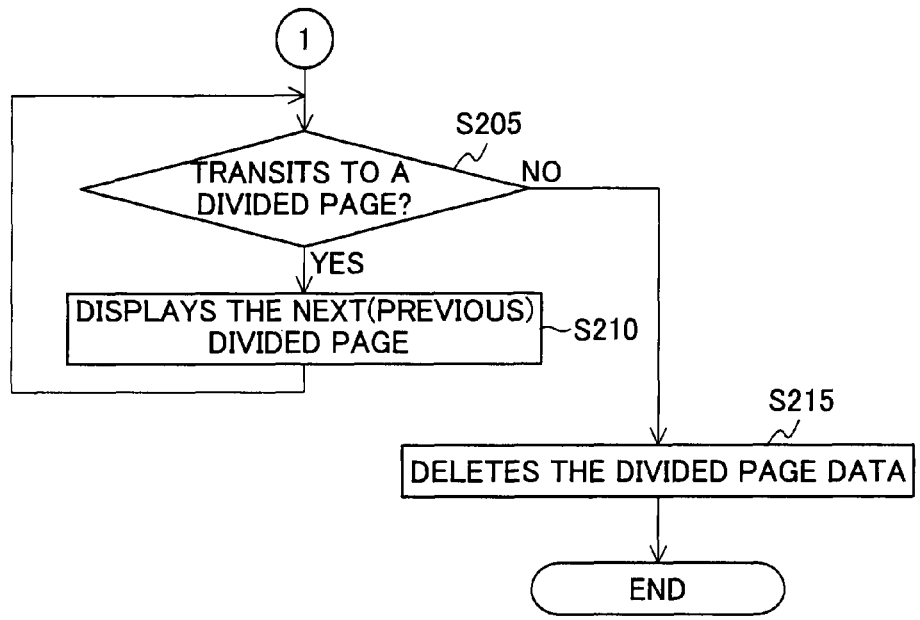
FIG. 7 is a flow chart showing the flow of processing according to a preferred embodiment of the present invention.
Figure 8:
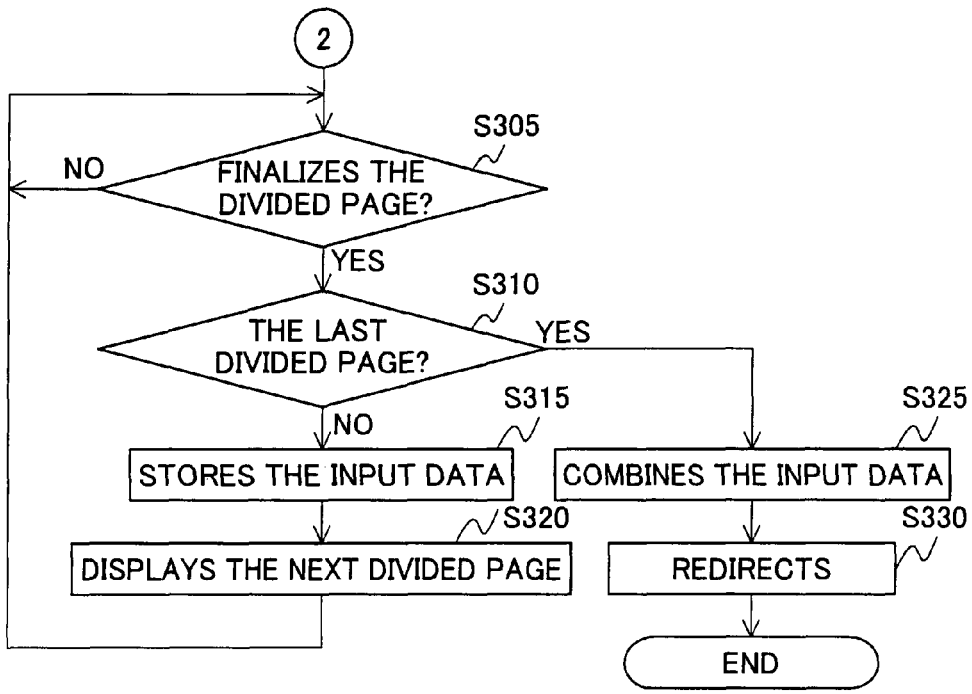
FIG. 8 is a flow chart showing the flow of processing according to a preferred embodiment of the present invention.

FIGS. 6 to 8 are flow charts showing the processing flow according to a preferred embodiment of the present invention. First, FIG. 6 is a flow chart describing the flow of the processing for dividing an html page.

In Step S105, the communication mechanism 111 receives the parameters and the URL specifying the requested html page from the operation panel 20 or the remote PC 30.

In Step 110, the container mechanism 113 obtains the html page coding from the view generating portion 15, based on the URL and parameters received in Step 105. In conventional systems, the html page coding is sent via the communication mechanism 111 to the operation panel 20 or the PC 30; however, according to the current embodiment, by providing the branching control mechanism 112, the html page coding is branched off to be subjected to division processing.

In Step S115, the view converting portion 13 sets the warning flag to ON, and provides for displaying a warning message if the division processing fails.

In Step S120, the view converting portion 13 searches out predetermined comment statements included in the html page coding obtained in Step 110. Then, a determination is made as to whether or not the conditions contained in each comment statement that is found match the size of the display area (Step S125), and the html page is divided at the position of each comment statement having conditions that match the size of the display area (Step S130).

Figure 16:
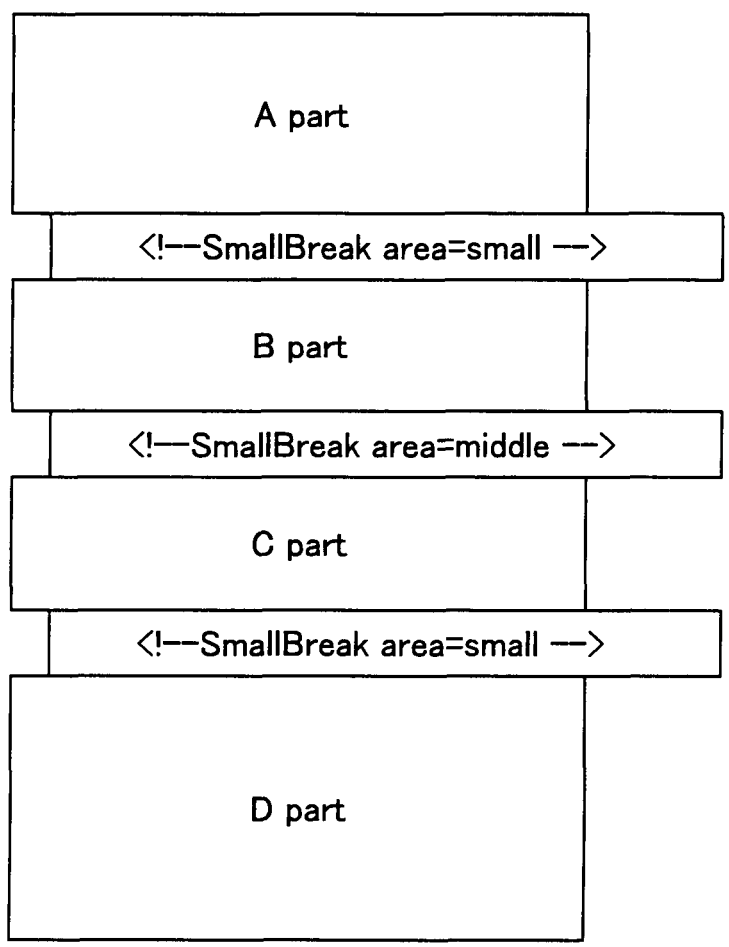
FIG. 16 shows examples of comment statements according to a preferred embodiment of the present invention.

Here, as an example of a comment statement, the size of the display area (of the panel display 21, the browser 31, etc.) may be categorized into a predetermined number of sizes, e.g., "small", medium", and "large", and the division position specified according to the three categories, as shown in FIG. 16.

In the example shown in FIG. 16, the attribute "area" is read out from comment statements including the keyword "Small Break", and the html page is divided at the positions of the comment statements having the attribute value corresponding to the size of the display area, which have been passed as a parameter (e.g., "small"). It should be noted that a detailed explanation of the division process is described below, with reference to FIGS. 12 to 15.

With reference to FIG. 16, if the display area is "small", for example, the view converting portion 13 divides the html page into three new html pages: A, B+C, and D. Furthermore, if the display area is "medium", the html page is divided into two new html pages: A+B and C+D. Moreover, if the display area is "large", the html page does not require dividing and is displayed as a single page: A+B+C+D.

Figure 17:
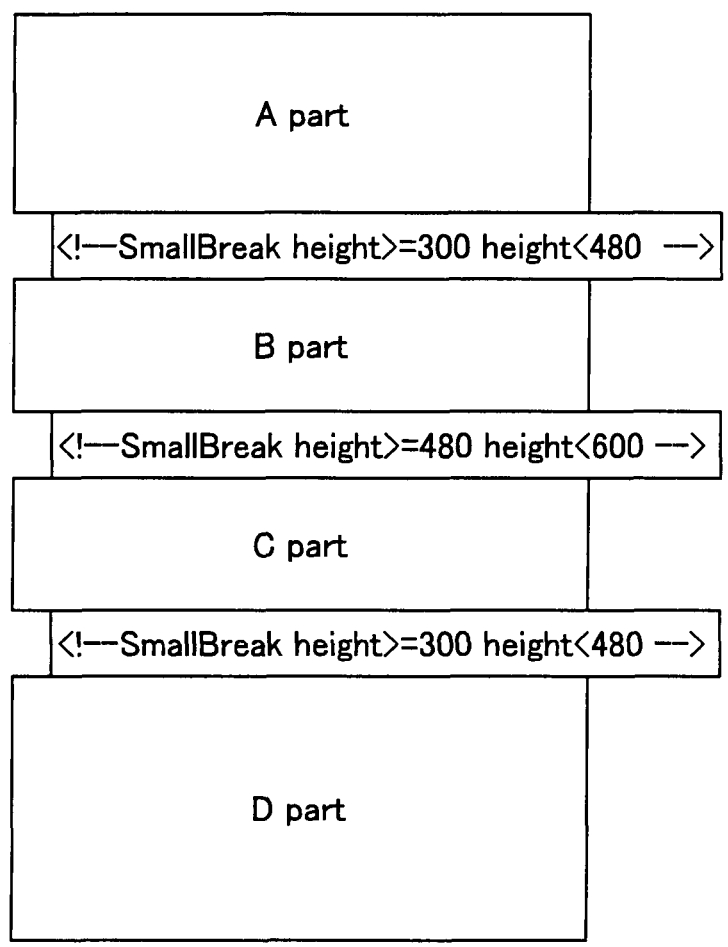
FIG. 17 shows an example of comment statements according to another preferred embodiment of the present invention.

In addition, as shown in FIG. 17, a pixel number range can be set as a conditional expression by an attribute such as "height" or the like. In the example shown in FIG. 17, the display area size is categorized based on the threshold values "300", "480", and "600", and the division position determined.

In the case in which the size of the display area is greater than or equal to "300" and less than "480", for example, the html page is divided into three new html pages: A, B+C, and D. Furthermore, if the size of the display area is greater than or equal to "480" and less than "600", the html page is divided into two new html pages: A+B and C+D. Moreover, if the size of the display area is greater than or equal to "600", the html page does not require dividing and is displayed as a single page: A+B+C+D.

Here, if the size of the display area is less than "300", the page is not divided at the position of any of the comment statements contained in the html page coding, and the page is not displayed; alternatively, a warning screen may be displayed.

In this manner, by specifying an attribute described in the comment statements, view converting portion 13 performs the division processing. Here, attribute specification may be for a plurality of attributes grouped together. At that time, if the size of the display area is smaller than the size of the specified conditions, either the page is not displayed or a warning message is displayed. Furthermore, if the size of the display area is larger than that specified in the conditions, the page is not divided.

In Step S135, the view converting portion 13 compares the conditions specified in the comment statement and the size of the display area. If the size specified in the conditions contained in the comment statement is larger than that of the display area, the processing proceeds to Step S145; if smaller, the processing proceeds to Step S140.

In Step S140, the view converting portion 13 sets the warning flag to OFF because either the division process performed in Step S130 has been completed successfully, or the size of the display area is large enough that division of the page is not necessary (NO determination in Step S135 returns).

In Step S145, the view converting portion 13 determines whether or not the html page coding has been searched to the end for comment statements; if there is still a possibility for further divisions to be made (in the case of NO), the processing returns to Step S120 and repeats the page division process. On the other hand, if the comment statement search has been completed, the processing proceeds to Step S150 when the required page division processing is completed.

In Step S150, the view converting portion 13 stores the html page coding of each of the divided html pages in the temporary storage portion 14. At that time, the html page coding each of the new html pages contains correlation data correlating the reciprocal relationships therebetween. Alternatively, the correlation data may be stored in the temporary storage portion 14. The divided view managing portion 12 determines the sequential relationship between each of the new html pages (the display order), whereby it becomes possible to select the suitable page for displaying.

As to the variation of storing the correlation data in the temporary memory portion 14, a Divided Page Table such as that shown in FIG. 9 can be used, for example. Here, the sequence numbers (the values shown in the Order field) together with the divided html pages (the pages shown in the New Pages field), and the input values (the values shown in the Input Data field) for the form elements appearing on each of the pages are stored with respect to the pre-divided html page (the page shown in the Input Page field).

In Step S155, the divided view managing portion 12 determines whether the warning flag is ON or OFF; if it is determined to be ON, display data representing a warning message is generated in Step S160.

If there is no warning, the display may be carried out normally; therefore, in step S165, the divided view managing portion 12 selects the first divided page (html page coding) stored in the temporary storage portion 14, and sends the html page coding to the branching control mechanism 112. Continuing, the branching control mechanism 112 sends the selected page to the display portion (the panel display 21 or the browser 31) via the communication mechanism 111, and displays the page.

In Step S170, the divided view managing portion 12 determines whether or not the pre-divided html page generated by the view generating portion 15 contains an input form or not. If an input form is included in the html page coding it signifies that data is to be received from the user, and the processing, therefore, proceeds to number 2 in FIG. 8; if there is no input form, the processing proceeds to number 1 in FIG. 7.

Display Switching Process Flow

FIG. 7 is a flowchart showing the flow of the process of switching between the divided pages when the pages consist solely of pages containing no input form elements therein.

In Step S205, the branching control mechanism 112 determines whether or not the page request data passed from the communication mechanism 111 indicates a page transition to a divided page. More specifically, by embedding the data representing the page transition destination in the "Next" or "Back" buttons shown in FIG. 4, for example, the page request data can be discriminated from the content of the URL. When it has been determined that a transition is to be a transition to a divided page, the URL data of the page is passed to the divided view managing portion 12, and the processing proceeds to Step S210.

In Step S210, the divided view managing portion 12 identifies the destination divided page, and causes the new page to be displayed by sending the identified page to the display portion via the communication mechanism 111. More specifically, the corresponding new html page is selected, for example, from the data included in the URL that indicates the transition destination page. Alternatively, the destination page can be identified by a request for transition relative to a present page that has been obtained by referring to a Cookie (e.g., if the "Next" button is clicked on from the page having the sequence number 2, the destination page is the page having sequence number 3).

In Step S215, upon determining that the page request from the user received in Step S205 is not for a transition to a divided page but to a separate URL, the branching control mechanism 112 terminates the display of the divided page and deletes the divided page data. More specifically, the corresponding data in the Divided Page Table (FIG. 9) is deleted, and the processing halted.

Figure 10:
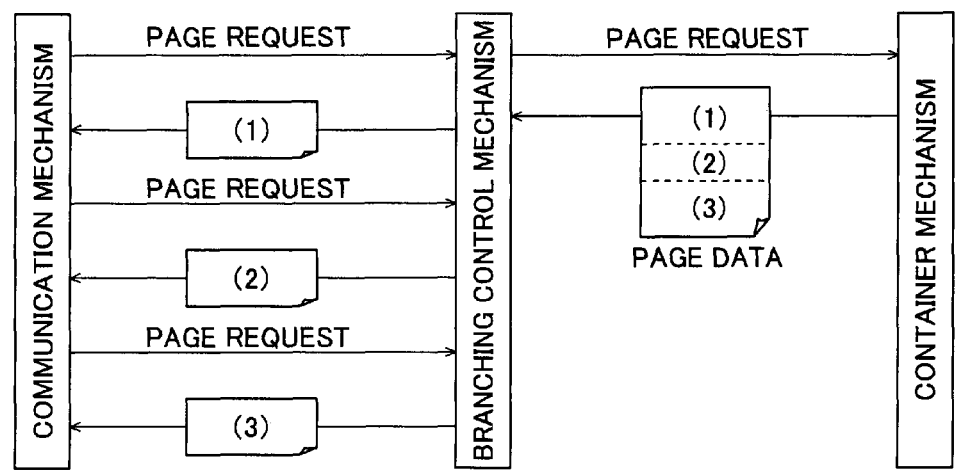
FIG. 10 is a block diagram showing an overview of a processing sequence according to a preferred embodiment of the present invention.

FIG. 10 shows an overview of a processing sequence. In response to a page request from the communication mechanism 111, the branching control mechanism 112 receives the page data (html page coding) via the container mechanism 113. Furthermore, in response to a page transition request from the communication mechanism 111, the branching control mechanism 112 transmits the corresponding page data (new html page coding).

Here, the branching control mechanism 112 determines whether the request from the communication mechanism 111 is for a transition to a divided page or a transition to a separate page (i.e. a new URL), and thereupon performs the branching processing, which consists of either selecting the corresponding divided page from the temporary storage portion 14 or requesting the separate page to the container mechanism 113.

Input Reception Process Flow

FIG. 8 is a flowchart showing the flow of the process of switching between divided pages occurring when the divided pages contain form elements therein for receiving input data from a user.

In Step S305, the branching control mechanism 112 determines whether or not the finalization of the input data for the form elements included in a divided page has been received. More specifically, the branching control mechanism 112 makes the determination from data that represents a redirect or the like transmitted upon the clicking on of a link such as a "Send" button by the user, for example, and the processing proceeds to Step S310.

In Step S310, the divided view managing portion 12 determines whether or not the present page is the last page in the group of divided pages stored in the temporary storage portion 14. More specifically, the determination can be made, for example, based on whether or not the sequence number of the divided page is the greatest value found in the Divided Page Table (FIG. 9). Alternatively, the determination can be made by receiving data indicating that the page is the last page together with a POST message. If the page is determined to be the last page, the processing proceeds to Step S325; if the last page has not yet been reached, the processing proceeds to Step S315.

In Step S315, the divided view managing portion 12 stores the finalized input data in the temporary storage portion 14. More specifically, the finalized input data can be stored, for example, in the Input Data field of the Divided Page Table (FIG. 9). In the case that the last page has not yet been reached, because the input data is only a portion of the data that is required in the pre-divided html page, it cannot be sent to the application (the view generating portion 15) as is. Therefore, until the input of all of the input data has been completed, the portion of input data received from each respective divided page is stored temporarily.

In Step S320, the divided view managing portion 12 selects the divided page (new html page) that follows the divided page for which the input data has been finalized, and causes the selected page to be displayed on the display portion via the communication mechanism 111. For pages containing form elements for receiving input data from users, it is desirable that the divided pages are displayed in order without skipping any pages, and that the input data is received from each page. Accordingly, the divided view managing portion 12 selects the next page to be displayed from the Divided Page Table (FIG. 9) according to the sequence number. Then, the processing returns to Step S305, and the framework portion 11 continues with the reception of the input data.

In Step S325, the divided view managing portion 12 combines the input data stored for each of the divided pages, and reconstitutes therefrom the input data corresponding to the pre-divided html page.

In Step S330, the container mechanism 113 transmits the input data reconstituted in Step S325 to the application (the view generating portion 15), whereby the next html page is received (redirected).

It should be noted that the divided view managing portion 12 may delete the divided page data (divided html page coding, input data, etc.) stored in the temporary storage portion 14 after the redirection has been completed, as the information is thereby no longer required.

Figure 11:
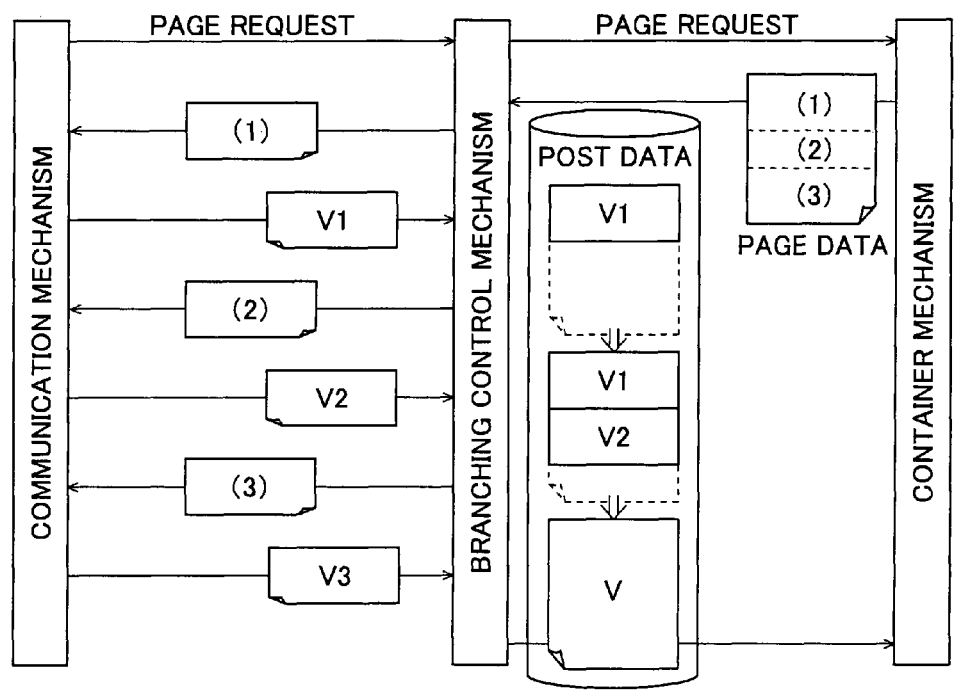
FIG. 11 is a block diagram showing an overview of a processing sequence according to a preferred embodiment of the present invention.

FIG. 11 shows an overview of a processing sequence. Upon reception of a page request from the communication mechanism 111, the branching control mechanism 112 receives the page data (html page coding) via the container mechanism 113. Furthermore, in response to receiving notification that the input data has been finalized (e.g., a POST message) from the communication mechanism 111, the branching control mechanism 112 transmits the data for each of the divided pages (new html page coding) in order.

At this time, the input data for each divided page (V1, V2, V3) is stored sequentially to finally reconstitute a POST data V, which serves as the POST data that is provided to the application (view generating portion 15) as parameter data.

Division Processing Details

Figure 12:
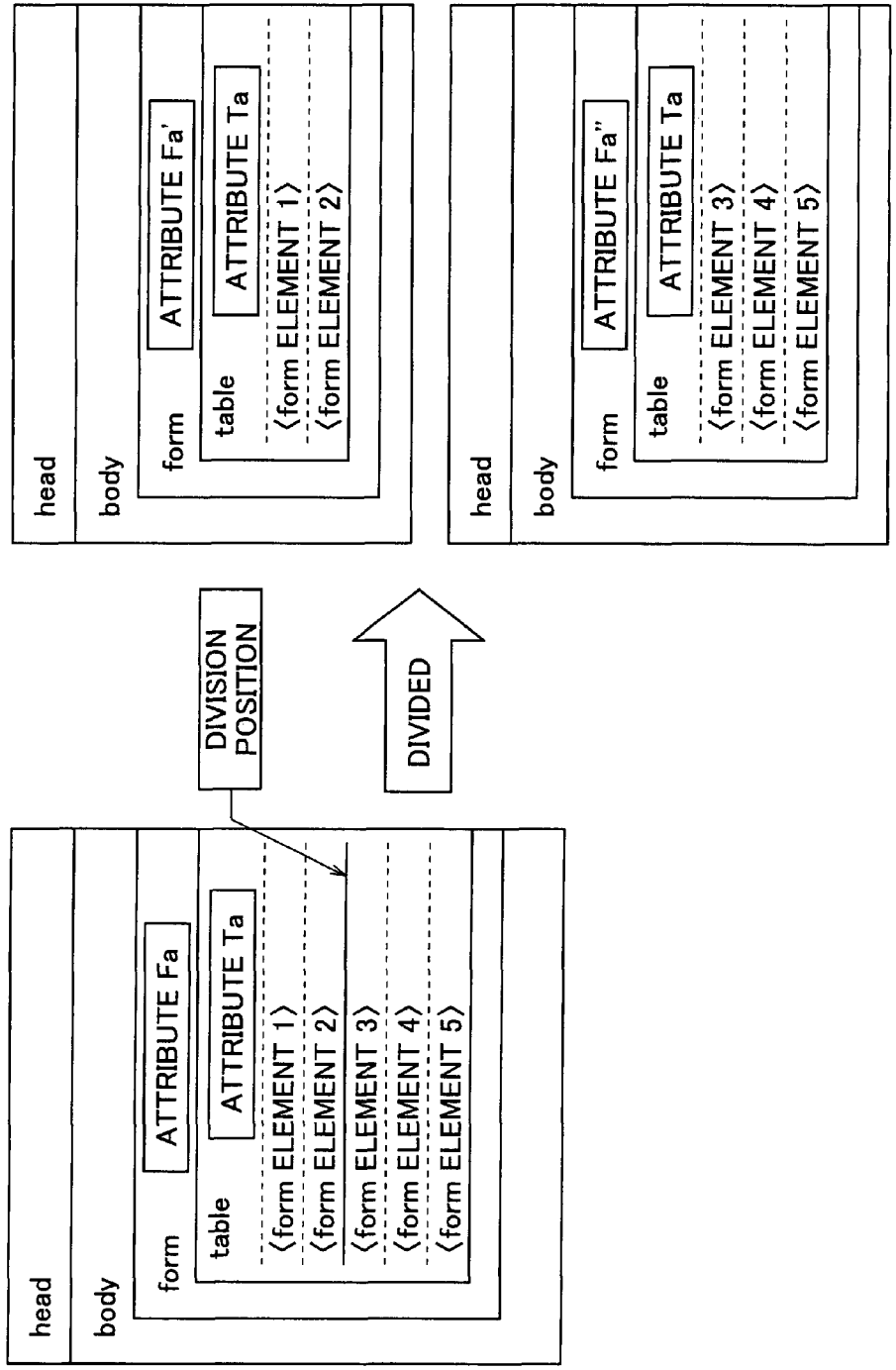
FIG. 12 shows the details of the processing for dividing an html page into two new html pages according to a preferred embodiment of the present invention.

FIG. 12 shows the details of the division processing for dividing an html page into two html pages according to a preferred embodiment of the present invention.

Here, the division position has been set within the Table elements in the pre-divided html page coding. When an html page is to be divided into new html pages, the attribute values described only in the upper portion above the division position (e.g., the Form attribute value Fa, the Table attribute value Ta, etc.) of the html page coding are also required for generating the new html page that is to be formed from the lower portion of the html page coding of the pre-divided page.

Furthermore, there are also cases in which the respective attribute values for the upper and the lower portions of the html page coding change due to changes in the configuration. In this case, by providing attribute values that have been suitably modified (e.g., Form attribute value Fa', Fa", and Table attribute value Ta), as required, the html page coding for the divided html pages which have been made capable of being displayed as new html pages is generated. Here, rules for converting the attribute values may be stored in advance, and read out and used as conversion rules corresponding to tag names and attribute names.

FIG. 13 shows a specific example of a page, the division process of which is explained below. There are two text boxes in the page shown in FIG. 13, and the page will be divided into two new pages each containing therein one of the text boxes.

FIG. 14 shows the html page coding for generating the html page shown in FIG. 13. Two text boxes are arranged as two lines <tr> (23 and 25 in FIG. 14) in the <table>, and the comment statement 24 is inserted therebetween to specify that the page is to be divided at that position. Furthermore, a "Send" button and a "Reset" button (26 in FIG. 14) are arranged on the third line; clicking on the "Send" button finalizes the data that has been input as input data to the text boxes, and transmits the input data to the application.

FIG. 15 shows the html page coding for two new html pages generated by dividing the html page coding shown in FIG. 14. The form element including the two text boxes has been divided (23 and 25 in FIG. 15) into two new html pages.

The <table> tag (22 in FIG. 15) may be of the same layout after division, so the same attribute value Ta as that shown in FIG. 13 is also used in the html page coding shown in FIG. 15; however, the attribute values of the <form> tag (number 21 in FIG. 14, and numbers 21a, and 21b in FIG. 15) have been converted to Fa' and Fa". Here, the attribute "name" has been derived from the original "form1", and to again make it distinguishable, consecutive numbers have been appended thereto (e.g., "form1.001", "form2.002"). Furthermore, for the attribute values of the attribute "action", in order to facilitate transition between the divided pages, the URL described in Fa' indicates the next divided page, and the URL described in Fa" is left as the original redirect destination.

In this manner, by having the transition destination set by the "action" attribute, when the clicking of the "Send" button by the user is received, the next divided page, which is the transition destination, is identified and the transition is carried out. Here, the "Send" and "Reset" buttons may both be present on each of the divided pages: copy the same coding content to the html page coding of each divided page (number 26 in FIG. 15).

As a result, the html page coding shown in FIG. 14 is divided so as to form two separate new html pages, each containing a single text box, and by providing as supplementary the <form> tag, the <table> tag, the <input> tag and the like, each page can be displayed as a separate html page with the same page view.

As described above, the controller 10 is an apparatus for converting an html page into new html pages. The controller 10 searches an html page for comment statements that have been formed according to predetermined grammatical rules and inserted in advance into the html page coding, divides the html page at positions at which comment statements are found to have been inserted, restores to each divided html page the attribute data lost due to the division process, and generates the new html pages.

It thereby becomes possible for the controller 10 to divide an html page into a plurality of html pages in order to create page views corresponding to the size of the display area of a display portion by discriminating the page division positions from the comment statements formed according to predetermined grammatical rules and inserted by the designer (the creator of the html page). Therefore, html pages can be divided according to the intention of the designer; furthermore, as this is accomplished by way of the simple and easily performed means of inserting comment statements, a method that reduces the burden of the designer can be provided.

In addition, because the inserted data is comment statements, browsers or other html processors not supporting the page division processing according to the present invention are able to read in and display the html pages containing the inserted comment statements without any problem. Therefore, the designer is able to easily specify page division locations in an html page without adversely affecting the display of the page on display devices for which it is not necessary that the page be divided in order to be displayed.

Furthermore, the controller 10 stores identification data identifying the size of the display area of a display portion, and searches out comment statements containing the identification data.

It thereby becomes possible for the controller 10 to discriminate the type of the display device (the type of the size of the display area thereof) from the description contained in the page division comment statements, whereby it becomes possible to provide divided pages corresponding to a plurality of respective display devices.

Furthermore, the controller 10 searches out the comment statements that contain the conditions satisfied by the stored identification data.

According to a configuration such as that described above, the page division comment statements can contain conditional expressions representing the range of the size of the display area, and the controller 10 is capable of discriminating the conditional expressions. In this manner, it becomes possible to provide a universally applicable page dividing method based on the size of the display area on which the page is to be displayed.

Furthermore, in the event that the size of the display area represented by the stored identification data is smaller than that described in any of the comment statements present in the html page coding, the controller 10 generates warning data representing a warning message.

According to a configuration such as that described above, in the event that the controller 10 is unable to find a suitable division position in the html page coding, and the size of the available display area would be insufficient to accommodate the page even if displayed, the controller 10 is able to cause a warning to be displayed. It thereby becomes possible to inform the user that there are items contained in the page that would not be capable of being displayed in the available display area, and also to provide an opportunity for modifying the design of the html page.

Furthermore, the controller 10 does not divide the html page if no page division comment statements are found.

According to a configuration such as that described above, if the controller 10 is unable to find a suitable page division position in the html page coding, the html page is displayed in its original, undivided state. In this way, the page view is not disfigured by unnecessary division of the page if the size of the display area of the target display area is adequate or the target display device is a display device for which the use thereof has not been foreseen.

Furthermore, together with the html page coding for the newly generated html pages, the controller 10 stores correlation data correlating reciprocal relationships therebetween, inserts at least one link into each of the new html pages to facilitate the referencing of the new html pages with respect to the reciprocal relationships therebetween, refers to the stored correlation data in response to the reception of the selection of a link, and selects the corresponding new html page.

It thereby becomes possible for the controller 10 to correlate reciprocal relationships between the new html pages, and to transit to the corresponding new html page. In other words, because a page transition can be caused by selecting one of the links (e.g., a "Next" button, "Back" button, or the like) added to the divided pages, it is possible to check each of the items of content contained in the pre-divided page numerous times, without missing any of the content thereof.

Furthermore, the controller 10 associates with each of the new html pages discrimination data identifying each of the new html pages and stores the discrimination data, inserts into each of the new html pages the discrimination data representing the page to which a transition is to be made so as to facilitate transition between the new html pages in a predetermined order, and selects the new html page corresponding to the discrimination data in response to the reception of a request for a transition.

It thereby becomes possible for the controller 10 to display the divided pages in a predetermined order by changing to the respective divided page indicated by a redirect initiated by the clicking on a link such as a "Send" button, for example, provided for transitioning between the divided pages in order. For example, if the pre-divided page is a page containing a form that includes input items, due to the fact that it thereby becomes necessary to distribute the input items over a plurality of divided pages to gather all of the input data included in the pre-divided page, by transitioning between the divided pages in an orderly fashion, the input data can be received without missing any items thereof.

Furthermore, the controller 10 stores the input data for the form elements included in each of the new html pages, assembles the input data, and reconstitutes the input data as the input data corresponding to the pre-divided html page.

It thereby becomes possible for the controller 10 to temporarily store the input data for the form elements distributed across the plurality of divided pages for each of the respective divided pages, to reconstitute the data at the stage in which the input for all of the divided pages has been received, and to treat the reconstituted data as the input data corresponding to the pre-divided html page. Therefore, even in the case of a page containing form elements requiring user input, it is possible for the controller 10 to divide the page without losing any of the original functionality thereof.

Furthermore, the present invention may be realized as a method for causing a computer to convert an html page to new html pages. The method searches an html page for comment statements that have been formed according to predetermined grammatical rules and inserted in advance into the html page coding, divides the html page at positions at which the comment statements are found to have been inserted, restores to each divided html page attribute data lost due to the division process, and generates the new html pages.

According to a configuration such as that described above, by having a computer execute the method, the same results as those described above can be expected.

Furthermore, the present invention may be realized as a computer-readable media recording a program for causing the conversion of an html page to new html pages in a computer. The program searches an html page for comment statements that have been formed according to predetermined grammatical rules and inserted in advance into the html page coding, divides the html page at positions at which the comment statements are found to have been inserted, restores to each divided html page attribute data lost due to the division process, and generates the new html pages.

According to a configuration such as that described above, by having a computer execute the program, the same results as those described above can be expected.

What is claimed is:

1. A method for causing a computer to display a page view on a display area by converting an html page into new html pages, comprising:
    receiving by the computer an html page for conversion;
    determining by the computer a display area of a display for displaying the html page;
    causing the computer to store in a memory an identification data identifying a size of the display area;
    causing the computer to search out comment statements that include the identification data, and have been inserted into the html page coding in advance,
        wherein the identification data includes at least one of: i) the size of the display area categorized into a predetermined number of sizes, and ii) the size of the display area categorized based on threshold values;
    causing the computer to divide the html page at a division position where the comment statements including the identification data are found to have been inserted,
        wherein i) a warning data representing a warning message in a case where the size of the display area is smaller than the size specified by the identification data in any of the comment statements present in the html page coding, ii) the html page is not divided in a case where the size of the display area is larger than the size specified by the identification data in any of the comment statements present in the html page coding; and
    causing the computer to restore to each of the divided html pages an attribute data that has been lost due to dividing the html page to generate the new html pages, wherein the attribute data, including a Form attribute value and a Table attribute value, is described in an upper portion above the division position in the html page coding of pre-divided page, comprising:
        reading the attribute data above the division;

copying the attribute data;
modifying the attribute data based on preset conversion rules; and
inserting the modified attribute data in a lower portion below the division position,
wherein the html page coding of pre-divided page includes a <form> tag and a <table> tag,
wherein the <table> tag is the same layout after the division of the html page, and the same Table attribute value is used in the new html pages,
wherein the <form> tag includes an attribute "name" and an attribute "action",
wherein the attribute "name" is appended consecutive numbers, and
wherein the attribute "action" describes a uniform resource locator (URL) that indicates the html page coding of next divided page; and
causing the computer to reference the URL, and select the corresponding new html page.

2. A method for causing a computer to convert an html page according to claim 1, wherein the computer is caused to not divide the page in a case where no comment statements are found.

3. A non-transitory computer readable media recording a program that causes a computer to display a page view on a display area by converting an html page to new html pages, the program causing the computer to perform:
receiving by the computer an html page for conversion;
determining by the computer a display area of a display for displaying the html page;
causing the computer to store in a memory an identification data identifying a size of the display area;
causing the computer to search searching out comment statements that include the identification data, and have been inserted into the html page coding in advance,
wherein the identification data includes at least one of: i) the size of the display area categorized into a predetermined number of sizes, and ii) the size of the display area categorized based on threshold values;
causing the computer to divide the html page at a division position where the comment statements including the identification data are found to have been inserted,
wherein i) a warning data representing a warning message in a case where the size of the display area is smaller than the size specified by the identification data in any of the comment statements present in the html page coding, ii) the html page is not divided in a case where the size of the display area is larger than the size specified by the identification data in any of the comment statements present in the html page coding; and
causing the computer to restore to each of the divided html pages an attribute data that has been lost due to dividing the html page to generate the new html pages, wherein the attribute data, including a Form attribute value and a Table attribute value, is described in an upper portion above the division position in the html page coding of pre-divided page, comprising:
reading the attribute data above the division;
copying the attribute data;
modifying the attribute data based on preset conversion rules; and
inserting the modified attribute data in a lower portion below the division position,
wherein the html page coding of pre-divided page includes <form> tag and a <table> tag,
wherein the <table> tag is the same layout after the division of the html page, and the same Table attribute value is used in the new html pages,
wherein the <form> tag includes an attribute "name" and an attribute "action",
wherein the attribute "name" is appended consecutive numbers, and
wherein the attribute "action" describes a uniform resource locator (URL) that indicates the html page coding of next divided page; and
causing the computer to reference the URL, and select the corresponding new html page.

* * * * *